Feb. 11, 1936.　　　K. M. HAMILTON　　　2,030,519
HEAT DISTRIBUTING MEANS
Filed Aug. 1, 1933　　　2 Sheets-Sheet 1

INVENTOR
K. M. Hamilton
BY
Evans & McCoy
ATTORNEYS

Feb. 11, 1936.   K. M. HAMILTON   2,030,519
HEAT DISTRIBUTING MEANS
Filed Aug. 1, 1933   2 Sheets-Sheet 2
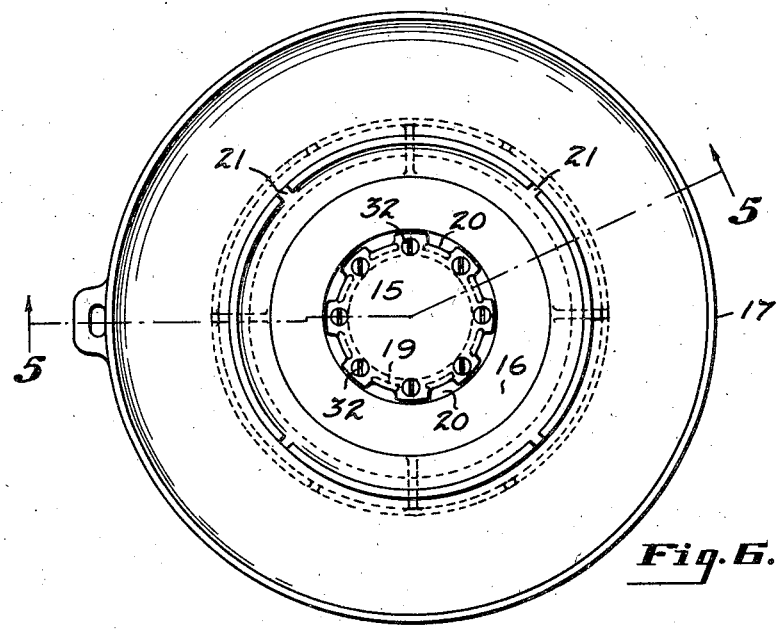
INVENTOR
K. M. Hamilton
BY
Evans & McCoy
ATTORNEYS Patented Feb. 11, 1936

2,030,519

UNITED STATES PATENT OFFICE 2,030,519

HEAT DISTRIBUTING MEANS

Karl M. Hamilton, Chicago, Ill.

Application August 1, 1933, Serial No. 683,183

5 Claims. (Cl. 126—215)

This invention relates to heat distributors and particularly to such devices for use with cooking utensils.

In the conventional gas stove there is a marked tendency when relatively large utensils, such as skillets, are heated, toward a localized central heating thereof, with the result that the central portion of the utensil becomes much hotter than the peripheral portion. This, of course, is very objectionable since the material in the utensil cannot be uniformly cooked, oftentimes even to the extent that by the time the material at the outer portion of the utensil is properly cooked the material at the center portion thereof may be overcooked or even burned.

One of the objects of the present invention is to provide a new and improved means for use with cooking utensils for providing an even distribution of heat to the bottom surface of the utensil.

Another object is to provide a means for use with cooking utensils to distribute and deflect the heat of a flame against the bottom of the utensil throughout an annular area.

A further object is to provide a heat distributing means for use with cooking utensils, which is of such construction as to prevent localized concentration of heat at the center of the bottom of the utensil.

With the above and other objects in view, which will be apparent from the following detailed description, the present invention consists in certain features of construction and combinations of parts which will be readily apparent to those skilled in the art to which the invention appertains.

In the drawings which illustrate a suitable embodiment of the present invention, Figure 1 is a side elevation of the device showing the same positioned above a gas burner, and showing a cooking utensil mounted thereon;

Fig. 5 is a transverse section taken approximately on the line 5—5 of Fig. 6 of a device of modified construction, in which a portion of the heat deflecting portion is formed of a separate part;

Fig. 6 is a plan view of the modified device illustrated in Fig. 5.

Figure 1:
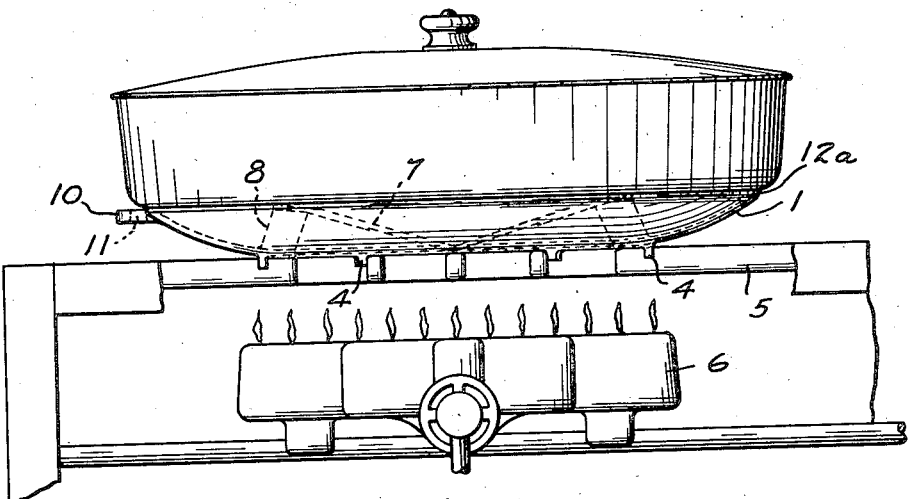
Figure 2:
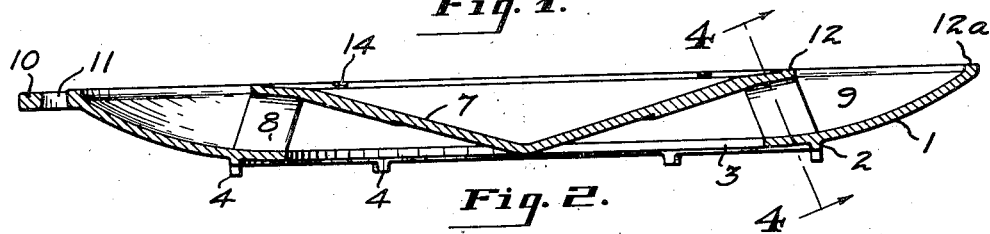
Fig. 2 is an enlarged section taken approximately on the line 2—2 of Fig. 3.
Figure 3:
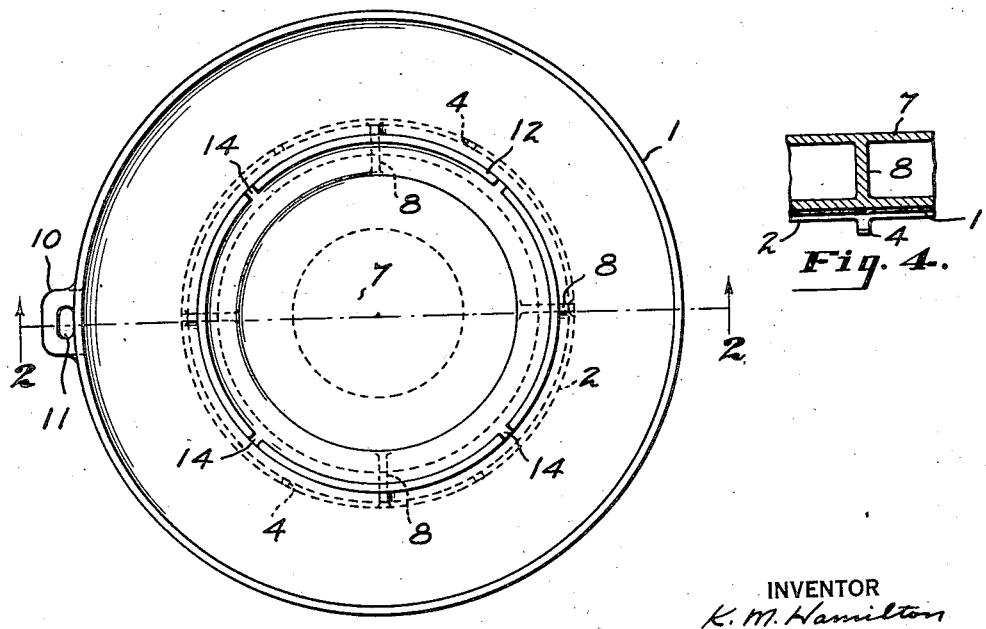
Fig. 3 is a plan view of the device illustrated in Fig. 1.
Figure 4:
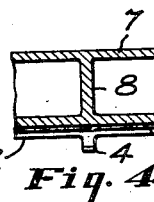
Fig. 4 is a section taken approximately on the line 4—4 of Fig. 3.

Referring to the accompanying drawings, in which like numerals refer to like parts throughout the several views, the heat distributing means of the present invention comprises an outer annular shell 1 which may be upwardly dished as shown in Fig. 2, and preferably having an annular flange 2 depending from the bottom surface thereof outwardly of the smaller central opening 3 thereof, the flange 2 being recessed to provide depending legs 4 for positioning the device on the grillwork 5 of a gas stove above a burner 6, as indicated in Fig. 1.

The shell 1 supports a concentric inverted conical deflecting member 7 through the medium of spaced vertical webs 8 which, if desired, may be integral with the shell 1 and member 7 and which space the member 7 above the shell 1 to provide an annular heat passage 9 between the shell 1 and member 7. The inner edge of the shell overlaps with the deflecting member 7 so that the heat is distributed upwardly and outwardly in an annular path through the annular passage 9.

The upper edge of the shell 1 is formed at one side with a flanged portion 10 having an opening 11 therein, so that the device may be hung when not in use from a suitable nail or hook.

The circular edge of the conical member 7 is preferably formed with a narrow flange 12, the surface of which is preferably coplanar with the upper edge 12a of the shell 1, so that a cooking utensil such as a skillet 13 may be supported thereon. However, the utensil may be supported wholly upon the deflector 7 with the peripheral edge of the bottom of the utensil extending partially over the annular space 9 between the deflector 7 and shell 1.

In order to prevent a dead air pocket from being produced within the deflector 7, it is preferred to provide the same with a number of notches or slots 14 in its peripheral flange 12. These slots 14 will permit the heated air to flow upwardly in the conical deflector 7 toward the bottom of the utensil supported thereby, and then to escape through the slots 14.

Furthermore, the central portion of the conical deflector 7 may, if desired, be of thinner metal than the outer portion in order to permit a more rapid heat transfer at this central portion.

It is preferable that the parts of the heat distributing device be integrally cast, although the shell 1 and conical deflector 7 may be separately formed and then secured together by any suitable means, such as screws, which may be threaded into the spaced webs 8.

The heat issuing to the space within the flange 2 and the central opening 3 strikes the inverted conical member 7 to heat the same, and is then deflected outwardly to pass between the member 7 and shell 1 in a substantially endless ring of heat where it concentrates against the bottom of the utensil supported thereon. Sufficient heat will radiate directly upwardly from the conical member 4 to heat the central portion of the utensil. Since the small outlets 14 are provided to prevent the formation of a dead air pocket within the conical deflector 7, this heat at the central portion together with the heat directed against an endless annular area throughout the bottom of the utensil near its periphery, serves to properly heat the bottom of the utensil and thereby prevent localized heat at the center of the utensil.

It is preferable, as shown in the drawings, to employ utensils which completely cover the annular opening 9 at the upper side of the distributing device, so that all the available heat may be utilized, although slightly smaller diametered utensils may be used. With a device of the character described, a much smaller gas flame may be employed with a resultant saving of fuel, since it is possible to utilize more of the available heat and provide a more even distribution of the heat.

In Figs. 5 and 6 I have shown a modified construction in which the central portion 15 of the conical deflector 16 that is supported by the annular outer shell 17, may comprise a separate piece or conical member. The main portion 16 is formed with a downwardly offset inwardly extending flange 18 which supports the central portion 15. The central portion 15 is formed near its periphery with a number of spaced axially extending projections 19 disposed to seat upon the flange 18 and space the portions above the flange 18, the peripheral edge of the portion 15 outwardly of the projections 19 is notched at intervals 20. In this construction, a small portion of the heat that is deflected by the deflector 16 enters the space between the flange 18 and central portion 15 and is deflected by the projections 19 so that it enters the space above the deflector and immediately below the utensil through the notches 20, the projections 19 serving to prevent the direct passage of the flame into the space underlying the utensil. The peripheral edge of the main portion 16 is also formed with notches 21 as in the construction previously described, in order to avoid the formation of a dead air pocket below the utensil supported on the distributing device. The central portion 15 is preferably secured to the flange 18 by means of suitable screws 32.

In each of the constructions described, the operation of the device is the same, and in each case it will be observed that the heat issuing into the central opening 3 will be directed outwardly and caused to contact the bottom of the utensil in an annular area, so as to prevent localized heating at the central portion of the utensil.

Although several embodiments of the invention have been herein shown and described it will be understood that numerous details of the construction shown may be altered or omitted without departing from the spirit of this invention as defined in the following claims.

What I claim is:

1. In a device of the character described, an outer annular shell of dished shape, a central inverted conical shell, and means carried by said outer shell for supporting said conical shell on said outer shell in spaced relation, the inner peripheral edge of said outer shell overlapping the peripheral edge of said conical shell, whereby to provide an annular heat directing passage, the peripheral edge of at least one of said shells being disposed to support a cooking utensil over the space between said shells, whereby heat entering the opening of said annular shell will be discharged in an annular region against the bottom of the cooking utensil, the peripheral edge of said conical shell having one or more heat discharge outlets, said central shell comprising an outer annular member and a central conical member supported on said annular member, said members having heat passages therebetween.

2. In a device of the character described, an outer annular shell of dished shape, a central inverted conical shell, and means carried by said outer shell for supporting said conical shell on said outer shell in spaced relation, the inner peripheral edge of said outer shell overlapping the peripheral edge of said conical shell, whereby to provide an annular heat directing passage, the peripheral edge of at least one of said shells being disposed to support a cooking utensil over the space between said shells, whereby heat entering the opening of said annular shell will be discharged in an annular region against the bottom of the cooking utensil, the peripheral edge of said conical shell having one or more heat discharge outlets, said central shell comprising an outer annular member having an offset flange and a central conical member having depending peripheral projections seated on said flange.

3. In a device of the character described, an outer annular shell of dished shape, a central inverted conical shell, and means carried by said outer shell for supporting said conical shell on said outer shell in spaced relation, the inner peripheral edge of said outer shell overlapping the peripheral edge of said conical shell, whereby to provide an annular heat directing passage, the peripheral edge of at least one of said shells being disposed to support a cooking utensil over the space between said shells, whereby heat entering the opening of said annular shell will be discharged in an annular region against the bottom of the cooking utensil, the peripheral edge of said conical shell having one or more heat discharge outlets, said central shell comprising an outer annular member and a central conical member having depending peripheral projections seated on said outer annular member adjacent the inner edge thereof to provide heat passages between said members, and means securing said members together.

4. In a device of the character described, an outer annular shell of dished shape, a central inverted conical shell, and means carried by said outer shell for supporting said conical shell on said outer shell in spaced relation, the inner peripheral edge of said outer shell overlapping the peripheral edge of said conical shell, whereby to provide an annular heat directing passage, the peripheral edge of at least one of said shells being disposed to support a cooking utensil over the space between said shells, whereby heat entering the opening of said annular shell will be discharged in an annular region against the bottom of the cooking utensil, the peripheral edge of said conical shell having one or more heat discharge outlets, said central shell comprising an outer annular member having an offset flange and a central conical member having depending peripheral projections seated on said flange, said central conical member having a plurality of peripheral notches therein to permit the passage of heat into the space thereabove.

5. In a device of the character described, an outer annular shell of dished shape, a central inverted conical shell, and means carried by said outer shell for supporting said conical shell on said outer shell in spaced relation, the inner peripheral edge of said outer shell overlapping the peripheral edge of said conical shell, whereby to provide an annular heat directing passage, the peripheral edge of at least one of said shells being disposed to support a cooking utensil over the space between said shells, whereby heat entering the opening of said annular shell will be discharged in an annular region against the bottom of the cooking utensil, the peripheral edge of said conical shell having one or more heat discharge outlets, said central shell comprising an outer annular member and a central conical member having depending peripheral projections seated on said outer annular member adjacent the inner edge thereof to provide heat passages between said members, said central conical member having a plurality of peripheral notches therein to permit the passage of heat into the space thereabove, said members being rigidly secured together.

KARL M. HAMILTON.